Nov. 26, 1968     A. H. BARKOW     3,412,867
GLASS RACK TRUCKS
Filed Sept. 13, 1966
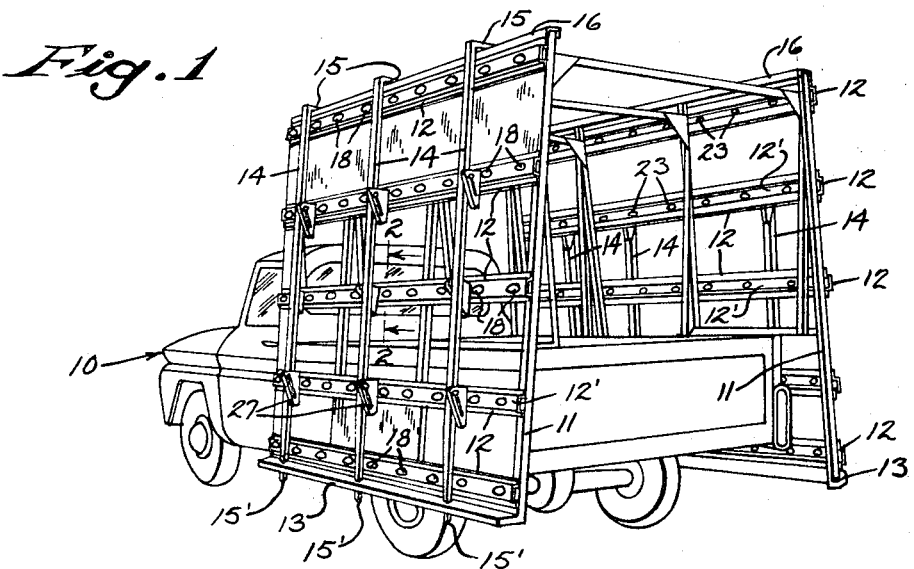
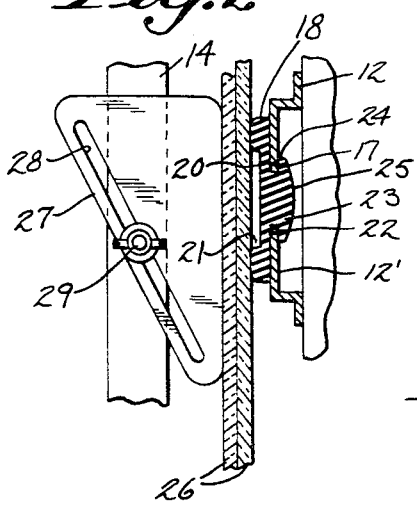
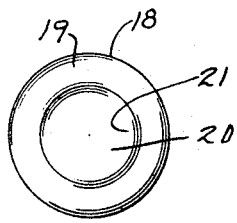
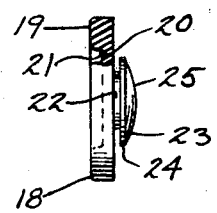
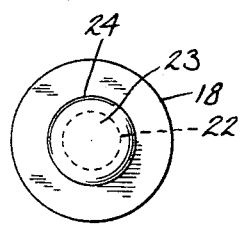
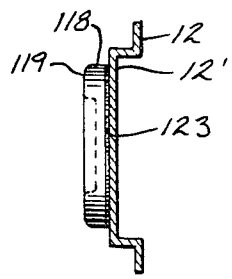
INVENTOR
ALVIN H. BARKOW
BY
*Morsell & Morsell*
ATTORNEYS 3,412,867
GLASS RACK TRUCKS
Alvin H. Barkow, Milwaukee, Wis., assignor to H.
 Barkow Company, Milwaukee, Wis., a corporation
 of Wisconsin
Filed Sept. 13, 1966, Ser. No. 578,656
3 Claims. (Cl. 211—41)

ABSTRACT OF THE DISCLOSURE

In a glass rack truck having vertically-spaced horizontal slats, rubber-like pads secured in longitudinally-spaced relationship along each slat in a position to be engaged by glass lights which are being transported, each pad having a shallow central recess surrounded by a heavy rim and being formed of relatively hard rubber-like material to provide a light suction effect which is easily broken when the glass lights are removed.

---

In the storing and transportation of glass sheets or lights it has been common practice to have racks with horizontally-extending, spaced slats against which the glass is adapted to rest, the glass being held in position by the use of upright poles or stakes having means associated therewith for releasably holding the glass against the horizontal slats so that it can be safely transported. Heretofore, it has been attempted to cushion the horizontal slats by gluing strips of rubber, felt, old carpeting, fire hose, or the like thereto. This was unsatisfactory as the strips pulled loose or became torn. Other cushioning methods for the horizontal slats have been attempted but none of these have been satisfactory.

In summary, the invention includes the securing of rubber-like pads in longitudinally-spaced relationship along upright surfaces of horizontally-extending portions of a glass rack truck so that the pads are in position to be engaged by a glass light when it is secured in position on the truck, each pad having a shallow central recess surrounded by a heavy rim whereby a light suction effect is created to prevent shifting of the glass during operation of the truck, the rubber-like material being of such hardness that the light suction effect is easily broken when the glass lights are being removed from the truck.

It is a general object of the present invention to provide improvements in the art of racking glass wherein novel means is employed on the slats to give a longer lasting, shockproof protection to the glass by means which will not pull loose.

A further object of the invention is to provide an improved glass cushioning pad which can be quickly installed, which will remain in position indefinitely, and which can be easily replaced, one at a time, if required.

A further object of the invention is to provide an improvement in the art of racking glass which is capable of automatically producing a light suction effect to prevent the glass from shifting forwardly or rearwardly during transit, the suction being sufficiently light that it does not interfere with the removal of the glass when required.

A more specific object is to provide, as one form of the invention, a novel pad having an expandable locking button projecting from its back side, which button is adapted to snap into a hole in a slat of the rack, whereby the button is replaceably maintained in position on the rack.

A further object is to provide, as another form of the invention, a pad having its back coated with a pressure-sensitive adhesive, whereby pads may be quickly installed on existing racks to replace loose or torn strips of rubber or other material.

With the above and other objects in view, the invention consists of the improvements in the art of racking glass, and all of its parts and combinations, as set forth in the claims, and all equivalents thereof.

In the accompanying drawing, illustrating one complete embodiment of the preferred form of the invention, in which the same reference numerals designate the same parts in all of the views:

FIG. 1 is a perspective view of a pickup truck having glass racks thereon which are constructed in accordance with the present invention;

FIG. 2 is a fragmentary sectional view taken on the line 2—2 of FIG. 1;

FIG. 3 is a front view of one of the improved pads;

FIG. 4 is an edge view thereof, part being broken away and shown in section;

FIG. 5 is a rear plan view;

FIG. 6 is a view similar to FIG. 4 showing a modified pad; and

FIG. 7 is a view similar to FIG. 2 showing one of the modified pads installed.

Referring more particularly to the drawing, the numeral 10 designates a pickup truck having glass racks 11 on opposite sides thereof. Each glass rack includes vertically-spaced, horizontal slats 12. At the lower edge of each rack is the customary horizontal ledge 13 for supporting the lower edges of glass lights. In addition, there are the customary glass-holding stakes or poles 14 which have top hooks 15 engageable with suitable openings in a top rail 16, the lower ends 15' of the stakes being receivable in holes in the ledges 13. Preferably, the racks are formed of steel and the stakes may be formed of wood or steel.

In the principal form of the invention the slats 12 are of metal and are provided with longitudinally-extending ribs 12'. Extending through each rib, in the principle form of the invention, is a series of circular holes 17. It is preferred that these holes be about eight inches apart throughout the length of each slat.

For cooperation with the holes are the novel pads 18 shown in FIGS. 2, 3, 4 and 5. These pads are formed of suitable relatively hard rubber or synthetic elastomer, such as the elastomer which is sold under the trademark "neoprene." In the preferred embodiment, "neoprene" having a durometer hardness of 60, a tensile strength of 1800 p.s.i., and an elongation factor of 350% was used. "Koroseal" having similar properties may also be employed. In the claims, the expression "rubber-like material" is intended to include natural rubber or synthetic rubber. In the preferred form of the invention the outer peripheral portion 19 of each pad is approximately one-fourth of an inch thick, and the portion 20 has a thickness of approximately one-half the thickness of the peripheral portion 19 to provide an outwardly-facing, shallow suction cup 21. In the preferred embodiment of the invention the pads have a diameter of 2⅜ inches. Projecting integrally from the rear of each pad is the stem 22 of a button 23, the stem preferably having a diameter of approximately one inch. The peripheral edge 24 of the button projects beyond the stem a distance of about ⅛ to 3/16 of an inch and tapers in thickness as illustrated. The short amount of overhang of the peripheral portion 24 plus its taper makes it possible to snap the button through a hole 17 in a slat. The rear face of the button is preferably convex as at 25. The diameter of the stem 22 is somewhat less than the diameter of the hole 17 in the slats, and this size relationship is such, in conjunction with the contour and flexibility of the overhanging periphery 24, to permit a button to be forced through a hole 17 in a slat with the projecting peripheral portions 24 of the button snapping outwardly after insertion to securely hold the pad in position, as illustrated in FIG. 2. In the preferred embodiment the holes 17 in the slats are 1 1/16″ in diameter as compared with the 1″ diameter of a stem 22. By having the slats 12 with hollow ribs 12' and by having the holes 17 in the ribs, and by having the buttons of less depth than the channel formed by a rib 12', the buttons are protected against contact during use of the truck or rack, as is clear from FIG. 2.

The modification of FIG. 6 has been designed more particularly for replacement purposes, as the slats on existing racks do not have the button-receiving holes 17. In the form of the invention of FIG. 6, the main portion of each pad is formed the same as the corresponding portion of FIG. 4 and is designated by the same numeral preceded by the digit 1. In this form of the invention there is no button projecting from the back; instead, a disk 123 of cellular rubber, coated on both sides with a pressure-sensitive adhesive is used. The pressure sensitive adhesive is used to permanently connect the disk 123 to the flat back of the pad proper, as illustrated in FIG. 6. Before installation of the pad, this adhesive on the other side is covered with a paper protecting disk 124 which may be peeled off in the manner shown in FIG. 6 just prior to application.

Use of the invention

In the use of the principal form of the invention, the glass lights, after having been placed in position on edge on the ledges 13, are normally urged toward the slats 12 by the angle of the racks. Due to the weight of the glass there will be a suction effect created between the pads and the back of the inner sheet of glass, as shown in FIG. 2. The suction effect will be augmented by the pressure which is usually applied to the lights of glass 26 by the adjustment of cleats 27 or other devices with which the stakes 14 are usually equipped. In FIG. 2, a triangular cleat 27 is illustrated having a diagonal slot 28, there being a bolt 29 projecting from the stake through the slot of each cleat. By means of a wing nut on the bolt the cleat may be held in a selected position to exert just the right amount of pressure on the glass. Thus a light pressure may be maintained against the glass to hold the glass securely against the pads 18. This light pressure augments the suction effect created by the cups 21. This suction is sufficient to prevent forward or rearward shifting movement of the glass lights during travel. At the same time, due to the fact that the pads are formed of relatively hard rubber, the light suction is easily broken after the stakes 14 are released and removed, so that there is no strong suction effect to render the removal difficult when the glass is to be left at a place of use.

The form of the invention of FIG. 6 is used in the same way just described, the only difference being that the pads of FIG. 6 are adhesively connected by use of the adhesive on the rear side of the disk 123, after the paper 124 has been peeled off, whereas the pads of FIG. 4 are connected to the slats by means of the expandable buttons 24. By providing a pad like those illustrated in FIG. 6, they may be readily used to replace broken and torn strips on racks which do not have button-receiving holes. Even if the adhesive on the disks 123 of FIG. 6 should cause release of a pad, which is not a normal occurrence, the pads may be easily replaced. The pressure sensitive adhesive on the cellular rubber disk 123 is a type which will adhere readily to metal and actually forms a stronger bond with age.

Various changes and modifications may be made without departing from the spirit of the invention, and all of such changes are contemplated as may come within the scope of the claims.

What I claim is:

1. In a glass rack truck having a bottom ledge on which glass lights are adapted to be supported on edge and having a glass-supporting side with continuous horizontally-extending portions which have surfaces disposed in upright planes parallel with the glass lights when the latter are in place, relatively small pads of rubber-like material secured in horizontally-spaced relationship to said upright surfaces of the glass-supporting side, and means for pressing and releasably maintaining the glass lights against said pads, said pads being of such thickness and so distributed as to maintain the glass out of contact with said glass-supporting side, each pad having a shallow central recess surrounded by a rim whereby a light suction effect is created when the glass lights are pressed against the rim to thereby prevent forward or rearward shifting movement of the glass lights during operation of the truck, the inner side of said rim being in contact with the upright surface of the glass-supporting side to brace the rim against distortion, the rubber-like material being of such hardness that the light suction effect is easily broken when the glass lights are being removed from the truck, the rim of each pad having substantial radial dimension relative to the radius of the pad so as to provide a surrounding, relatively flat surface for contact with the glass lights.

2. A glass rack truck as claimed in claim 1 in which the horizontally-extending portions having the upright surfaces are formed by vertically-spaced, horizontal slats, and in which the pads are secured in longitudinally-spaced relationship along each slat.

3. A glass rack truck as claimed in claim 2 in which each slat has an outwardly-projecting hollow, longitudinal rib provided with longitudinally-spaced holes, and in which there is means projecting from the rear of each pad for coaction with one of said holes to maintain the pad in position.

References Cited

UNITED STATES PATENTS

| 2,082,577 | 6/1937 | Herschmann. | |
| 2,144,092 | 1/1939 | Werner | 248—363 XR |
| 2,302,802 | 11/1942 | Roberts | 248—363 |
| 2,815,919 | 12/1957 | Pribil | 248—363 |
| 2,887,231 | 5/1959 | Schodorf | 211—41 |
| 2,953,253 | 9/1960 | Henderson | 211—41 |

FOREIGN PATENTS 219,494  1/1962  Austria.

ROY D. FRAZIER, *Primary Examiner.*

ABRAHAM FRANKEL, *Assistant Examiner.*